(12) United States Patent
Stauder et al.

(10) Patent No.: US 8,724,892 B2
(45) Date of Patent: May 13, 2014

(54) METHOD FOR DESCRIBING AN ACTUAL COLOR GAMUT OF A COLOR DEVICE OR OF A COLOR CONTENT

(75) Inventors: Jürgen Stauder, Montreuik sur Ille (FR); Laurent Blonde, Thorigne Fouillard (FR); Patrick Morvan, Laille (FR)

(73) Assignee: Thomson Licensing, Boulogne-Billancourt (FR)

( * ) Notice: Subject to any disclaimer, the term of this patent is extended or adjusted under 35 U.S.C. 154(b) by 780 days.

(21) Appl. No.: 12/452,744

(22) PCT Filed: Jul. 25, 2008

(86) PCT No.: PCT/EP2008/059839
§ 371 (c)(1),
(2), (4) Date: Jan. 20, 2010

(87) PCT Pub. No.: WO2009/016138
PCT Pub. Date: Feb. 5, 2009

(65) Prior Publication Data
US 2010/0128976 A1 May 27, 2010

(30) Foreign Application Priority Data

Jul. 27, 2007 (EP) .................................... 07301279
Dec. 18, 2007 (EP) .................................... 07301698

(51) Int. Cl.
*G06K 9/00* (2006.01)
(52) U.S. Cl.
USPC ............ 382/162; 382/167; 382/154; 385/1.9; 385/520
(58) Field of Classification Search
USPC ........... 382/162, 167, 154, 226; 358/1.9, 520, 358/502, 515, 518, 530; 345/431, 199, 600, 345/590, 443
See application file for complete search history.

(56) References Cited

U.S. PATENT DOCUMENTS

| 5,525,589 | A |   | 6/1996  | Etzweiler et al. |
| 5,704,026 | A |   | 12/1997 | Wan |
| 5,721,572 | A | * | 2/1998  | Wan et al. ..................... 345/590 |
| 6,480,301 | B1 |  | 11/2002 | Cholewo |

(Continued)

FOREIGN PATENT DOCUMENTS

| EP | 612840  | 2/1994 |
| EP | 0626783 | 11/1994 |

(Continued)

OTHER PUBLICATIONS

Search Report Dated Oct. 2, 2008.

(Continued)

*Primary Examiner* — Mekonen Bekele
(74) *Attorney, Agent, or Firm* — Tutunjian & Bitetto, P.C.

(57) ABSTRACT

To describe the actual color gamut, a hierarchical structure is proposed which comprises, from bottom to top:
  Gamut Components: each GC is a surface, generally described as a set of connected elementary triangles or polygons.
  Gamut Hulls: each GH is a closed surface formed by the concatenation of connex Gamut Components.
  Gamut Instances: each GI is an alternative Gamut Boundary Description of the same actual gamut and is built by the union of the volume(s) bordered by at least one Gamut Hull.

Such a Gamut Boundary Information may be notably used for gamut mapping operations. Among advantages of the invention, are flexibility and adaptation to available memory and bandwidth capabilities.

14 Claims, 3 Drawing Sheets

(56) References Cited

U.S. PATENT DOCUMENTS

| | | | |
|---|---|---|---|
| 7,233,413 B2 * | 6/2007 | Jones et al. | 358/1.9 |
| 7,557,952 B2 * | 7/2009 | Tsukada | 358/1.9 |
| 7,567,362 B2 * | 7/2009 | Tin | 358/1.9 |
| 8,189,010 B2 * | 5/2012 | Mebane | 345/590 |
| 8,207,982 B2 * | 6/2012 | Tin | 345/589 |
| 2004/0100643 A1 * | 5/2004 | Jones et al. | 358/1.9 |
| 2005/0047654 A1 | 3/2005 | Newman et al. | |
| 2006/0072133 A1 | 4/2006 | Han et al. | |
| 2007/0035751 A1 * | 2/2007 | Presley et al. | 358/1.9 |
| 2007/0052719 A1 | 3/2007 | Tin | |
| 2007/0080973 A1 * | 4/2007 | Stauder et al. | 345/589 |
| 2007/0081176 A1 | 4/2007 | Newman et al. | |
| 2007/0805855 | 4/2007 | Tin | |
| 2010/0128055 A1 * | 5/2010 | Blonde et al. | 345/590 |
| 2010/0328341 A1 | 12/2010 | Stauder et al. | |

FOREIGN PATENT DOCUMENTS

| | | |
|---|---|---|
| EP | 1100256 | 5/2001 |
| JP | 7030774 | 1/1995 |
| JP | 2002118759 | 4/2002 |
| JP | 2006507769 | 3/2006 |
| JP | 2006203526 | 8/2006 |
| JP | 2006345187 | 12/2006 |
| WO | WO2004049127 | 6/2004 |
| WO | WO2007024494 | 3/2007 |

OTHER PUBLICATIONS

ITU-R BT.601-5: 1995, Studio encoding parameters of digital television for standard 4:3 and wide-screen 16:9 aspect ratios.

ITU-R BT.709-4:2000 Parameter values for the HDTV standards for production and international program exchange.

IEC 61966-2-4, Ed. 1.0 Multimedia systems and equipment. Color measurement and mgmt. Part 2-4: Color management Extended-gamut YCC color space for video applications xvYCC, Jan. 17, 2006.

SMPTE-274M-2005 SMPTE Standard for Television 1920x1080 Image Sample Structure, Digital Representation and Digital Timing Reference Sequences for Multiple Picture Rates.

Hitachi et al.: High definition Multimedia Interface. Specificatin Version 1.3a, Nov. 10, 2006.

Morovic et al,: The Fundamentals of Gamut Mapping: A Survey, draft submitted to the Journal of Imaging Science and Technology, 45/3:2182-290, vol. 45, No. 3, May/Jun. 2001.

Lien: Approximate Convex Decomposition and its applications. A dissertation Submitted to The office of Graduate Studies of Texas A & M University Dec. 2006.

Katoh et al.: Corresponding Color Reproduction from Softcopy to Hardcopy Images. PhD thesis, Chiba University, Japan, 2002.

* cited by examiner

METHOD FOR DESCRIBING AN ACTUAL COLOR GAMUT OF A COLOR DEVICE OR OF A COLOR CONTENT

This application claims the benefit, under 35 U.S.C. §365 of International Application PCT/EP2008/059839, filed Jul. 25, 2008, which was published in accordance with PCT Article 21(2) on Feb. 5, 2009 in English and which claims the benefit of European patent application No. 07301279.1, filed Jul. 27, 2007 and European patent application No. 07301698.2, filed Dec. 18, 2007.

Gamut mapping is necessary in order to map, in a given color space, colors from a source gamut of colors into a target gamut of colors. Usually the boundary in this color space of such a color gamut is described by some kind of gamut boundary information. A gamut of colors is related to a specific color device, such as an image capture device or as an image display device, or to a specific color content, such as a video content, or a still image As an example, the color gamut of a display device is determined by the display technology chosen. At this moment, a consumer has the choice between different display technologies including, for example, liquid crystal display (LCD), Plasma display panels (PDP), cathode ray tube (CRT), digital light processing (DLP) for projection, or OLED display ("Organic Light Emitting Diodes"). These different technologies lead generally to different color gamuts. There also can be significant differences between two representatives of the same display technology. For example, two liquid crystal display sets can be equipped with different sets of backlight sources. One of these sets of light sources may be cold cathode fluorescent lights (CCFL), where the color gamut mainly depends on the phosphors used. Historically, these light sources did not permit the use of a high color gamut. In fact, displays that used these light sources could not reproduce all 709 colors, as per the International Telecommunication Union (ITU) 709 color standard for high definition. However, recent developments have brought products to market that use so-called wide gamut cold cathode fluorescent lights (W-CCFL), where the color gamut is even larger than the 709 color gamut. Another component of liquid crystal display technology is the color filters, which could be designed to have a high light output and, thus, a high light efficiency with a narrow color gamut, or could be designed to have a luminous light efficiency and a wider color gamut. Another trend is that LCD display's CCFL back light units (BLU's) get replaced by RGB LED (Light Emitting Diodes) BLU's with an even higher color gamut.

The current video content on digital video disks (DVD's), television broadcasts, and/or via video over Internet Protocol (VOIP), are encoded in a color space with a reference color gamut or a standard gamut related to a standardized gamut. Color contents, instead of being video content, can be an image, an object of any selection in an image. With the advent of new gamut displays, it has become possible to display a wider range of colors than was previously possible. An extended color gamut is now feasible. The current trend seems to be the use of open, unrestrictive color standards. One example of such standard is based on a XYZ color space for Digital Cinema, or xvYCC (IEC 61966-2-3) for consumer television. Other examples include, for example, sYCC (International Electrotechnical Commission (IEC) 61966-2-1), ITU-R BT.1361, or e-sRGB (Photographic and Imaging Manufacturers Association (PIMA) 7667) for computer graphics and still picture photography.

Even in the case of wide gamut content on a wide gamut display, there still is a problem where colors may be displayed incorrectly due to the color gamut of the wide gamut content being different than the color gamut of the wide gamut display. In fact, by using the above mentioned unrestrictive color standards like xvYCC or XYZ, it is always possible that a color gets transmitted that cannot be displayed on one or more particular wide gamut displays. Consequently, Gamut mapping has to be performed in order to map, in a given color space, colors from the wide gamut content into the wide gamut display.

When a color device or a color content receives gamut boundary information (for any of source or target), it would be preferable that the format and representation of the gamut boundary information that allows flexible use depending on available memory size of the device, depending on available computational power of the device and depending on type and required precision of the planned gamut mapping operation.

Known methods using gamut boundary information (GBI) often rely on a single Gamut Boundary Description (GBD) that gives one possible description of the boundary in color space of such a gamut. Often, a GBD has either a large memory footprint in order to reach high precision or requires complex geometric operations due to its non-convex shape.

An object of the invention is to solve these problems.

For this purpose, a subject of the invention is a method for describing, in a color space, an actual color gamut by at least one gamut boundary description, called "gamut instance" (GI), wherein said method comprises:

the definition of at least one gamut hull (GH) as a closed surface bordering a volume, such that each gamut instance (GI) is formed by the union of the volume(s) bordered by at least one gamut hull (GH);

the definition of a plurality of gamut components (GC) such that each gamut hull (GH) is formed by the concatenation of several connex gamut components (GC), wherein each gamut component (GC) represents a surface.

This method then generates a Gamut Boundary Information (GBI) able to describe the said actual color gamut. The actual color gamut may be related to a color device or to a color content, being source or target, or other. This Gamut Boundary Information (GBI) can be used to any purpose, notably to perform color transformation of a color content using a color transform system.

This Gamut Boundary Information includes one or more gamut instances. Each gamut hull (GH) represents a closed surface. When a gamut instance is formed by the union of the volume of only one gamut hull, it means that this gamut instance is formed by this gamut hull itself. Each gamut hull may belong to several gamut instances. Each gamut component represents a part of the surface of a gamut hull. Each gamut component may belong to several gamut hulls.

Then, the logical structure of the gamut boundary information according to the invention comprises, from bottom to top:

Gamut Components (GC): each GC is a surface, generally described as a set of connected elementary triangles or polygons in the color space.

Gamut Hulls (GH): each GH is a closed surface formed by the concatenation of connex Gamut Components (GC). A GH is described by a set of GCs the concatenation of which forms the closed surface of this GH.

Gamut Instances (GI): each GI is an alternative Gamut Boundary Description (GBD) of the actual gamut and is built by the union of the volume(s) bordered by at least one Gamut Hull (GH) and is described by the set of GHs the union of the volume(s) of which forms this GI.

Preferably, at least one gamut component (GC) of said plurality of gamut components is used for the definition of at least two different gamut hulls (GH), allowing then to reduce the memory footprint of the Gamut Boundary Information (GBI) in a color transform system.

Preferably, the method for describing the actual color gamut comprises the definition of a plurality of gamut hulls, and at least two of said gamut hulls (GH) of said plurality that are used to define a same gamut instance have a non-empty intersection. Notably when this gamut instance is non-convex, the gamut hulls that are used to define this gamut instance are preferably convex and, as a consequence, some of the volumes that are bordered by these gamut hulls have a non-empty intersection. Preferably, at least one gamut instance being non-convex, any gamut hull that is used to define a gamut instance, even the non-convex gamut instance, is convex. Any non-convex gamut instance is then decomposed into several gamut hulls, each of these gamut hulls being convex. Generally, at least two of these gamut hulls bordering volumes have non-empty intersection. Again, thanks to the use of only convex gamut hulls, the computational load that is required for color transforms is advantageously lowered.

Preferably, the method for describing the actual color gamut comprises the definition of a plurality of gamut hulls, and at least one gamut hull (GH) of said plurality of gamut hulls is used for the definition of at least two different gamut instances (GI), allowing then to reduce the memory footprint of the Gamut Boundary Information (GBI) in a color transform system.

Preferably, the method for describing the actual color gamut comprises the definition of a plurality of gamut instances, wherein each of them describes differently the same color gamut of the color device in the same color space. It has to be pointed out that the same color gamut, although being described differently in FIG. 7 and in FIG. 8 of U.S. Pat. No. 5,704,026, is not described in the same color space, but respectively in the CMY color space and in the Lab color space. Such a method according to the invention can be advantageously used to implement gamut boundary description that are disclosed in the documents US2006/072133, US2007/052719, US2007/085855, where a given actual color gamut is represented by a plurality of GBDs rather than by a single GBD (Gamut Boundary Descriptor). As disclosed in these documents, before mapping colors, the appropriate GBD have to be chosen. In comparison with these documents, an advantage of the invention is that the reuse of gamut components and, preferably, of gamut hulls in different gamut boundary descriptors allows reducing the memory footprint in a color transform system.

Preferably, at least one gamut instance is convex and at least one other gamut instance is non-convex. Using both non-convex and convex gamut instances allows advantageously lowering the computational load for color transforms, as color transforms that are based on convex shapes generally requires lower computational load than color transforms that are based on non-convex shapes.

Preferably, among said plurality of gamut instances, some of them contain different percentages of colors of the actual color gamut. Using gamut instances differentiating by their percentage of colors allows advantageously performing color transforms that better fit the color content of a video sequence or a video sink.

Among the plurality of gamut instances, some of them are defined at least by a given level of color population and differ by their levels of color populations. All gamut boundary descriptions belonging to the same gamut instance that is defined by at least a given percentage of colors or a given level of color population have the same percentage of colors or the same level of color population. Using a plurality of gamut boundary descriptions allows then for use of gamut boundary descriptions containing different percentages of colors of the actual color gamut. If P indicates the number of levels of color populations, there are then P groups/gamut instances having different percentages of colors or different levels of color populations.

Preferably, among said plurality of gamut instances, some of them describe the same shape with different level of details. If K indicates the number of level of details, there are then K gamut instances having different level of details to describe the same shape as a specific description of the actual color gamut. Advantageously, a video sink to color transform can then choose the level of detail appropriate for aimed color reproduction performance. The level of detail is mainly characterized by the total number of faces that are used finally for the definition of a GI. The total number of faces used by a GI is the number of all faces indexed by those GCs that are indexed by those GHs that are indexed by the mentioned GI. The total number of faces influences usually the geometric precision of the GBD describing the actual gamut. The total number of faces determines also the required memory or transmission rate when using the mentioned GI.

Preferably, the method for describing the actual color gamut comprises the definition of elementary polygons, notably triangles, such that each Gamut Component (GC) is formed by the concatenation of several connex elementary polygons. Then, the logical structure of the gamut boundary information according to the invention comprises also polygons, generally described by a set of its vertices. U.S. Pat. No. 6,480,301 and U.S. Pat. No. 5,704,026 disclose the description of color gamut boundaries by a network of elementary polygons. The method for building a gamut boundary information that is able to describe an actual color gamut, either source or target, is preferably based on elementary triangles (or any other elementary polygons) in a gamut mapping color space, each of these triangles being notably defined by three vertices. Such a gamut boundary information (GBI) is transmitted and/or stored as "Gamut ID metadata".

The subject of the invention is also a method of color gamut mapping of colors, in a given color space, from an actual source color gamut into an actual target color gamut, comprising the description of either source or target, or both, actual color gamut by the method according to one of the preceding claims. The colors to map may belong to an image of a series of images. These colors may belong to a video content, to a video sink, to a series of frames, to an object in an image, or to any other pictorial content.

The actual source color gamut as the actual target color gamut may be the gamut of color device or the gamut of a color content. The color device may be an image capture device, as a camera or a scanner, or an image display device, as a PDP (Plasma Display Panel), a LCD or a CRT, or a printer that is able to print color film or paper, or an image encoder, or an image transcoder. The color content may be any color media as a color film, a CD or a DVD, or any color flux that is transmitted according to specific standards, such as JPEG or MPEG electronics files.

The format and representation of the gamut boundary information that is obtained notably when using the method of color gamut mapping according to the invention allows advantageously flexible use depending on available memory size of the device, depending on available computational power of the color device and depending on type and required precision of the planned gamut mapping operation. This method allows choosing the gamut boundary descriptions that bring the best comprise between the different requirements concerning the level of details, the color content of the images to map that is also related to the level of required color population, the computational load, the available memory size, the available transmission bandwidth.

This invention can preferably be used for Gamut Mapping (GM) in video sinks with variable or different memory capacities. In this case, the GBI consists of a series of GI each having different levels of detail. For example:

A first GI defined by a single first GH defined by two GCs with low precision and low memory footprint, the first GC being a surface describing the high luminance half of the gamut, the second GC being a surface describing the low luminance part of the gamut. Both GCs concatenated give the first GH. The first GI defined by this first GH is used by video sinks having low memory capacity.

A second GI defined by a single second GH defined by the first GC—having a small memory footprint—describing the high luminance half of the gamut and a third GC—having a larger memory footprint—describing the low luminance part of the gamut in higher precision. This GI is used by video sinks having medium memory capacity. The second GI has the advantage to better represent low luminances where the human eye is more sensible.

A third GI defined by a single third GH defined by a fourth GC—having a larger memory footprint—describing the high luminance half of the gamut in higher precision and the third GC describing the low luminance part of the gamut in higher precision. This GI is used by video sinks having high memory capacity. The third GI has the advantage to better represent all luminances and its use will give a high quality result.

In another case, this invention can preferably be used in case of non-convex gamuts for Gamut Mapping (GM) in video sinks with variable or different computational capacity. In this case, the GBI consists of two GI that are formed as follows:

A first GI defined by a single first GH being non-convex. This GI is used by video sinks having high computation capacity being capable of using non-convex shapes for geometric operations.

A second GI defined by a series convex GH (for example a second GH and a third GH). The union of the volumes defined by the GH specifies the volume described by the second GI. This GI is used by video sinks having low computation capacity being capable only of using convex shapes for geometric operations. The second GI has the advantage of being defined by only convex shapes (GH). The second GI has the inconvenient that it may describe the actual gamut only in an approximate manner.

According to a preferred embodiment of the invention, the gamut boundary information (GBI) is organized into three levels:

in a first level, the gamut boundary information (GBI) is composed of a multitude of alternative Gamut Boundary Descriptions (GBD) which are called Gamut Instances (GI), each GI describing said actual gamut and having a specific geometrical shape and its specific memory footprint;

in a second level, each of said Gamut Instances (GI) is composed of a set of Gamut Hulls (GH), each gamut hull being a boundary description of a closed volume in color space. Each Gamut Instances (GI) is describing said actual color gamut by the union of the volumes bordered by the Gamut Hulls (GH) of the set of Gamut Hulls. Preferably, at least two of said Gamut Hulls (GH) that are used to describe a same gamut instance have a non-empty intersection;

in a third level, each gamut component (GC) is described as a set of connected triangles or polygons in the gamut mapping color space, each triangle being composed of three vertices. Each gamut component represents a part of a gamut hull, i.e. a part of a surface. The closed surface of each Gamut Hull (GH) is described by the concatenation of a plurality of Gamut Components (GC).

An advantage of the invention is a combination of a large set of options to represent the gamut of a color device or of a color content:

Using a multitude of GI allows for use both of non-convex and convex GBDs to describe the same actual color gamut, as disclosed, for instance, in WO 2007/024494.

Using a multitude of GI allows for use of GBDs containing different percentages of colors of the actual color gamut, as disclosed, for instance, in EP1100256 and in EP612840.

The use of more than one gamut hulls (GH) to build each GI allows to represent non-convex gamut boundaries using convex shapes, as disclosed in the PhD thesis of JYH-Ming Lien (see below).

The reuse of gamut component(s) (GC) in different gamut hulls (GH), then possibly for different GI, allows reducing the memory footprint.

The use of triangles, as in U.S. Pat. No. 5,721,572, or polygons, as in US2007/081176, U.S. Pat. No. 6,480, 301 and U.S. Pat. No. 5,704,026, allows hardware acceleration using existing standards.

Vertices of the triangles or polygons can be marked as gamut ridges in order to be able to avoid their smoothing, if a smoothing step of the GBD is subsequently performed, as explained with more detail in the non-yet published patent application EP2007-301166.

JYH-Ming Lien reviews and proposes in his PhD thesis published in December 2006 at the Texas A&M University thesis entitled "Approximate convex decomposition and its applications" algorithms that subdivide graphical, non-convex objects into convex components that have empty intersection. The concatenation of the different components describes the original object.

The invention will be more clearly understood on reading the description which follows, given by way of non-limiting example and with reference to the appended figures in which.

Figure 1:
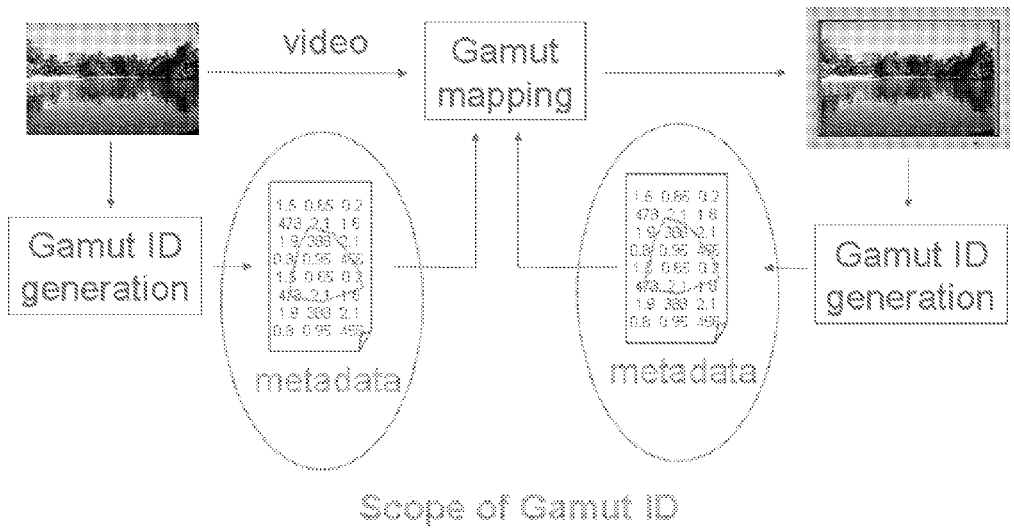
FIG. 1 illustrates the scope of the Gamut Boundary Information (GBI) or "Gamut ID metadata" according to the invention.

INTRODUCTION OF THE DESCRIPTION OF THE GAMUT BOUNDARY INFORMATION (GBI) ACCORDING TO THE INVENTION

In 2006, the International Electrotechnical Commission (IEC) published the standard IEC 61966-2-4 "Multimedia systems and equipment—Color measurement and management—Part 2-4: Color management—Extended-gamut YCC color space for video applications—xvYCC". This IEC 61966-2-4 standard defines a wide-gamut color encoding. This standard was adopted in 2006 for the HDMI 1.3 standard [See: High-Definition Multimedia Interface, Specification Version 1.3, Nov. 10, 2006]. At the same time, a gamut metadata packet was adopted also for this HDMI 1.3 standard, that is able and adapted to describe the video content color gamut. The video content gamut is the color gamut used for the creation of the video content. It may correspond, for instance, to the color gamut of a reference display device that is used for content creation. Another possibility is that the video content color gamut corresponds to a limited, artistically defined color gamut that is used for content creation, for example bluish colors for a science fiction motion picture. This gamut metadata packet that was adopted for the standard HDMI 1.3 allows video sinks—for example a consumer's target display—with color gamut different to the content gamut—often more limited gamut—to properly process wide gamut content.

In order to allow correct colorimetric color reproduction of the video content on a target color device, as a display device, three conditions have generally to be satisfied:

1) The encoding of colors of the content has to be correctly understood and decoded by the target color device;

2) Colors out of the target color device have to be identified and processed in a controlled manner.

3) The viewing conditions of the target color device have to be controlled in order to master the color appearance to a human observer using this target color device.

The "Gamut Boundary Information" and the format of the corresponding "Gamut ID metadata" according to the invention address mainly the second condition. Out-of-gamut colors are usually processed by gamut mapping (GM) algorithms in order to satisfy the second condition mentioned before. When out-of-gamut colors cannot be correctly reproduced on a target color device, it is a question of color appearance and artistic intent to know by which valid color an out-of-gamut color is to be replaced by an in-gamut color by the gamut mapping process.

The Gamut Boundary Information (GBI) according to the invention allows advantageously a unified format—called gamut ID metadata—in order to define a gamut of a color device or of a video content in order to transmit this Gamut Boundary Information (GBI) to a video sink so that it can apply gamut mapping. Moreover, this unified format can be advantageously adapted in order to define the gamut of the video sink in order to transmit this Gamut Boundary Information (GBI) to the content creator so that he can handle colors that are out of the gamut of the video sink.

If the video sink does not know the actual color gamut of the video content, it needs to map all incoming colors in some way into the sink's gamut In order to keep image details, the video sink will use some kind of gamut mapping (GM) that is generally more sophisticated than just clipping. The GM algorithm will map all colors that may occur in the content into the sink gamut. The possible colors are defined by the employed color encoding rule (for example SMPTE S274M), called color encoding gamut. The video content color gamut is generally identical or smaller than the color encoding gamut. If the actual video content color gamut is not available, GM will be based on the color encoding gamut. This GM is then not well adapted to the video content and may be too strong causing loss or over-shooting contrast and saturation. Such a result is least acceptable when the video content color gamut is close to the sink gamut.

The Gamut Boundary Information according to the invention solves this problem by preferably associating the video content color gamut to the video content to be mapped.

Scope of the Gamut Boundary Information (GBI) According to the Invention:

FIG. 1 shows the scope of the Gamut Boundary Information (GBI) and of the "Gamut ID metadata" according to the invention. The Gamut Boundary Information (GBI) is preferably associated to a video content or to a video sink. Associated to video content, the GBI describes the content color gamut. Associated to a video sink, it describes the color reproduction gamut of the sink, i.e. the color gamut of a target display device. It contains "Gamut ID metadata" describing the color gamut of the video content or the color gamut of the video sink. This video content may be a single frame or image, a series of frames, just a visible object, or any other pictorial content. The general architecture of the Gamut Boundary Information (GBI) is explained in detail below. The format (Gamut ID metadata) that may be used for this Gamut Boundary Information (GBI) is also explained in detail below. The generation of Gamut Boundary Information (GBI) is an open field for the content creator to create added value. Known methods such as convex hull or alpha shapes can be used. The use of the Gamut Boundary Information (GBI) such as for the gamut mapping (GM) is an open field for manufacturers of video sinks such as DVD players or target display devices.

Gamut Mapping is a well-known topic in the scientific literature [See: Katoh, N., Corresponding Color Reproduction from Softcopy Images to Hardcopy Images, PhD thesis, Chiba University, Japan, 2002] and a survey of methods of gamut mapping was prepared by the CIE [See: Morovic J. and Luo M. R., The Fundamentals of Gamut Mapping: A Survey, Journal of Imaging Science and Technology, 45/3:283-290, 2001]. Gamut Mapping is an open field for manufacturers of displays and other video sinks to create added value.

From HDMI Standard Version 1.3 to Gamut Boundary Information According to the Invention:

HDMI 1.3 standard allows in the transmission profile P0 (28 bytes) a gamut-related metadata packet. The High Definition Multimedia Interface (HDMI) is an industrial standard used for video connections of color devices, notably of display devices. The gamut metadata packet is mandatory as soon as the video is represented in IEC 61966-2-4 xvYCC color space. This specification version 1.3 includes:

Indication of a color space (ITU-R BT.709 RGB, IEC 61966-2-4 YCbCr in SD or HD colorimetry);

Indication of a color precision (24, 30, 36 bits/color);

Four basic primary colors defining summits or basic primary vertices of the color gamut (black, red, green, blue).

Secondary colors and white are deduced from the gamut-related metadata packet, the gamut boundary is then defined by eight basic colors (called basic primary and basic secondary gamut vertices). It is obvious that HDMI 1.3 standard is restricted to color content that has a content gamut identical to an imaginary additive three primary display.

Compared to HDMI 1.3 gamut-related metadata packet, the Gamut Boundary Information (GBI) according to the invention includes preferentially the following additional features:

More than four basic primary vertices in order to improve the precision of the geometrical definition of the color gamut;

Indexed faces sets, each face being defined by three vertices (describing how a 3D faces in color space are build from the vertices, as known from OpenGL and MPEG-4) in order to support existing hardware;

Scalability in order to allow different levels of precision for the geometrical definition of the color gamut, and thus in order to adapt to different color device classes;

Multiple GBD versions in order to be able to support different GM algorithms, if required;

Multiple GBD versions in order to be able to use GBD having simple geometry using preferably convex shapes, for instance for low computational load.

These additional features are motivated in the following sections.

Preferred Requirements for the Gamut Boundary Information (GBI) According to the Invention:

To be practical, the Gamut Boundary Information (GBI) according to the invention should preferably support scalability and low computational complexity. To be powerful, this gamut Boundary Information (GBI) has to consider the physical features of color spaces and needs to support creative processes in content production.

The requirements for this Gamut Boundary Information (GBI) are notably:

Scalability
Allow different levels of gamut precision
Low Computational complexity
Support existing graphics standards
Allow simple geometry using convex shapes
Allow gamut decomposition into sub-gamut modules
Small memory footprint
Allow multiple re-use of sub-gamut modules
Physics-based
Consider gamut ridges due to colorant channels
Creative
Consider importance and population of colors These requirements are not met by the prior art, as for instance by the gamut metadata packet of HDMI version 1.3.

Figure 2:
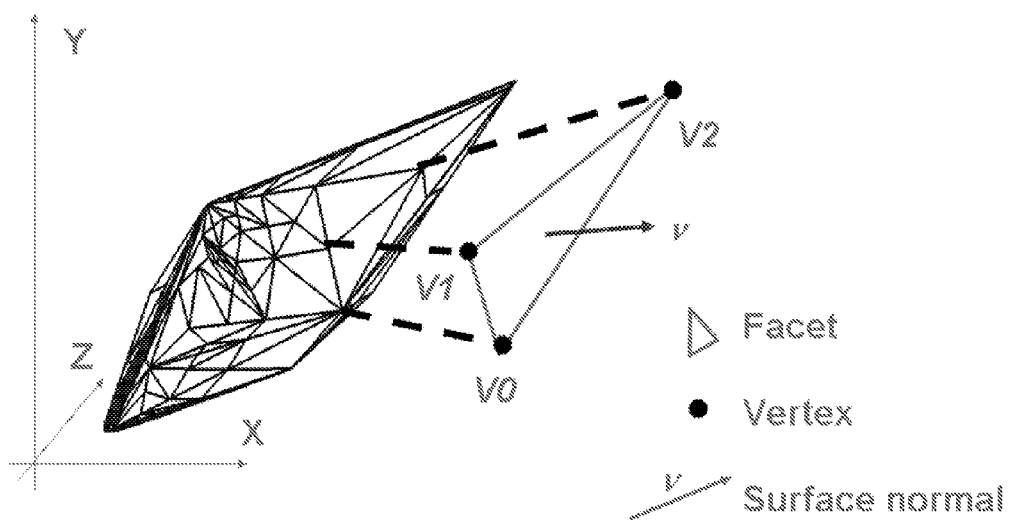
FIG. 2 illustrates an example of a color gamut that is part of a Gamut Boundary Information (GBI) according to an embodiment of the invention.

Hierarchical Structure of the Gamut Boundary Information (GBI) according to the Invention:

The Gamut Boundary Information (GBI) according to the invention describes the color gamut of a video content by using Gamut Boundary Descriptions (GBDs). A GBD describes the two-dimensional surface of a three-dimensional color gamut in a color space. A GBD is classically based on a set of indexed faces. Faces are for instance triangular surface elements. FIG. 2 shows an example of a color gamut that could be contained in the Gamut Boundary Information (GBI) of a video content. The Gamut Boundary Information (GBI) corresponding to the sample color gamut shown in FIG. 2 contains a set of vertices (V0, V1, V2, . . . ). Each vertex is defined by is its coordinates in CIEXYZ color space. Coordinates in CIEXYZ color space are encoded as standardized RGB or YCbCr values according to either SMPTE 274M standard or IEC 61966-2-4 standard.

The Gamut Boundary Information (GBI) corresponding to the sample color gamut shown in FIG. 2 contains also a set of faces (F0, . . . ). Let F0 being the sample face emphasized on FIG. 2. Face F0 is defined by three indices 0, 1, 2 of its three vertices V0, V1, V2. A set of faces is called indexed faces set. The surface normal of a face of a set always points outside the color gamut. According to the order of indices 0, 1, 2, the surface normal of the face F0 is defined as follows:

$$v = \frac{(V2 - V0) \times (V1 - V0)}{|V2 - V0| \cdot |V1 - V0|}$$

with x being the vector cross product and |●| being the vector length operator.

Figure 3:
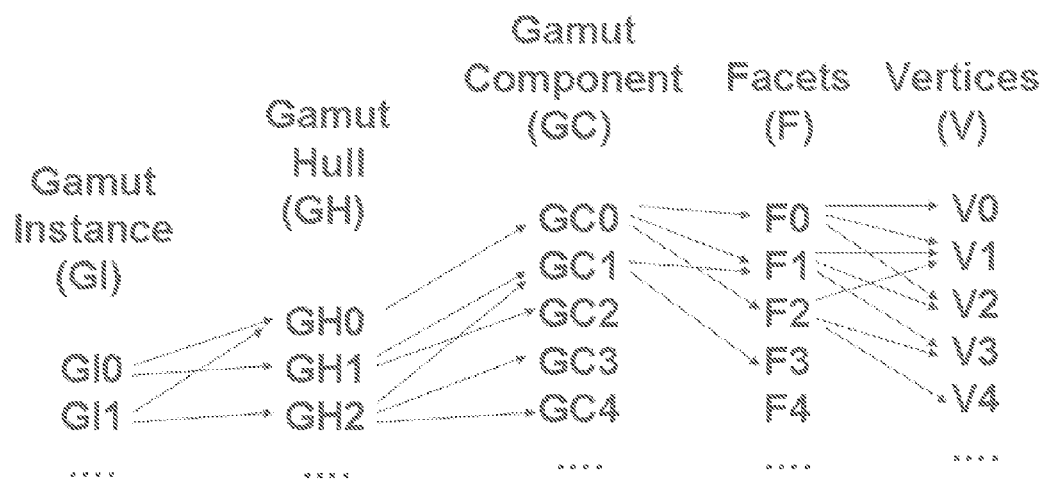
FIG. 3 illustrates the hierarchical structure of a Gamut Boundary Information (GBI) according to a preferred embodiment of the invention.

The Gamut Boundary Information (GBI) according to the invention is organized in a hierarchical manner as shown in FIG. 3. A complete Gamut Boundary Information (GBI) is further more detailed as containing a set of each of the following elements:

Vertices: a set of vertices, wherein each vertex is defined by its three color coordinates;

Faces: a set of indexed faces, wherein each face is defined by exactly three indices of three corresponding vertices of the set of vertices;

Gamut Components (GC): a set of gamut components, wherein each GC is a connex 2D surface in 3D space, and is defined by a list of at least one face;

Gamut Hulls (GH): a set of gamut hulls, each gamut hull (GH) being defined by a list of at least one Gamut Component (GC), the concatenation of which forms a closed surface bordering a connex volume;

Gamut Instance (GI): a set of gamut instances (GI), each of these gamut instances (GI) being defined by a list of at least one Gamut Hull (GH) and representing an alternative Gamut Boundary Description (GBD) of the actual gamut of the video content or of a display device Each Gamut Instances (GI) is described by the union of the volumes bordered by the Gamut Hulls (GH) of the list of Gamut Hulls (GH).

Other surfaces than 2D surfaces are possible. A GC can be for example an (N−1)-dimensional hyper surface in an N-dimensional color space, where N is the dimension. Other elementary surface elements than faces and vertices are possible. For example, elementary surfaces can be peaces of splines surfaces defined by a set of control points.

The hierarchical structure that is used for the Gamut Boundary Information (GBI) according to the invention allows satisfying the mentioned requirements as shows in Table 1.

TABLE 1

| Requirement | GBI Feature | Advantage |
| --- | --- | --- |
| Scalability: Allow different levels of gamut precision | GBI may contain K > 1 alternative GIs, each GI describing different levels of details of definition of the gamut. | The video sink can chose the level of detail appropriate for aimed color reproduction performance. |
| Low Computational complexity: Allow simple geometry using convex shapes | GBI allows for geometry with convex and/or non-convex shapes. It may contain alternative GIs, at least one using convex shape and one using non-convex shape. | The video sink may choose the GI using convex shape in order speed up geometrical operations. |
| Low Computational complexity: Support existing graphics standards | GBI is globally based on an indexed faces set. | Accelerated operations in OpenGL and graphics hardware |
| Low Computational complexity: Allow gamut decomposition into sub-gamut modules. | GBI may contain modular GIs, each of those GIs being defined by the union of one or more GHs. | The video is able to handle non-convex gamuts while speeding up geometrical operations using convex GHs. |
| Small memory footprint: Allow multiple re-use of sub-gamut modules | The GBI may contain modular GHs, each GH being defined by one or more Gamut Components (GCs). A GC may be used by more than one GH. | Parts of gamut shape that are common to different GIs are defined only one time, memory footprint is reduced. |
| Physics-based: Consider gamut | A Vertex used to define a face of a GC may contain | The video sink is able to avoid smoothing at |

TABLE 1-continued

| Requirement | GBI Feature | Advantage |
|---|---|---|
| ridges due to colorant channels | a flag indicating that it represents a summit or a ridge of the surface of the gamut, and/or with non-continuous gamut surface curvature. | ridges and summits when manipulating gamuts. |
| Creative: Consider color population | GBI may contain P > 1 alternative GIs, each GI describing alternative gamuts containing different percentages of colors of the actual gamut. | The video sink can differentiate between frequent colors and rare colors. |

Figure 4:
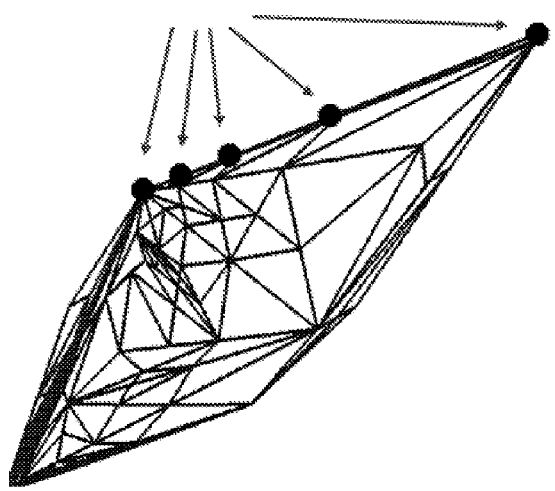
FIG. 4 illustrates the marking of ridges or summits that belongs to a color gamut of a Gamut Boundary Information (GBI) according to a preferred embodiment of the invention.

Examples and Advantages of the Gamut Boundary Information (GBI) According to the Invention—Special Cases An example for the physics-based requirement to consider gamut ridges due to colorant channels is shown in FIG. 4. Colorant channels correspond to the coordinates of physical signal values that control a color device, such as a film printer. Those colorant channels can be as a set of vectors in color space spanning the color gamut. Such a color gamut will have ridges and summits resulting from the spanning process. Preferably, vertices belonging to a gamut ridge or to a gamut summit are marked with a flag called VT that is considered as metadata. Ridges can be lines on the color gamut surface linking for two of the summits of a color gamut. Summits can be for example primary colors, secondary colors, black point, or white point.

Figure 5:
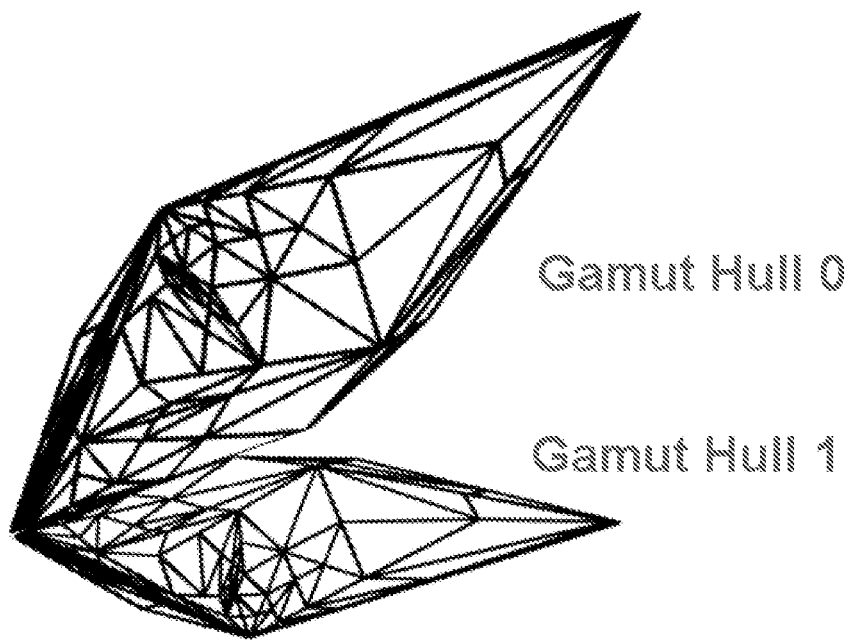
FIG. 5 illustrates the decomposition of a non-convex color gamut decomposition into convex gamut components, according to a preferred embodiment of the invention.

An example of the decomposition of one gamut instance (GI) into several gamut hulls (GH) according to the invention is illustrated on FIG. 5. In this example, Gamut Hull 0 and Gamut Hull 1 are both convex and the Gamut Instance (GI) describing the actual color gamut that is proposed is made of the union of these two Gamut Hulls. This Gamut Instance (GI) is not convex. When using such a gamut decomposition according to the invention, geometrical operations such as line-gamut intersection or interior-exterior determination can advantageously make use of simple geometry with convex hulls, then avoiding advantageously the high computational complexity requirement of non-convex shapes.

The set of gamut components (GC) of the Gamut Boundary Information (GBI) according to the invention may advantageously comprise so-called "non-inverted" (i.e. normal) GC and "inverted" GC. Non-inverted and inverted GC are physically any GC from the set of GC of the GBI, they differentiate just in their use. "Non-inverted" GC are used as they are, while "inverted" GC are supposed to have faces with inverted surface normals. By this definition a GC can be a surface separating two GH. When using two gamut hulls GH0, GH1 to define a given gamut instance GI, when these two gamut hulls GH0, GH1 have a common surface represented by a given non-inverted gamut component $GC_{CN}$ and the corresponding inverted gamut component $GC_{CI}$, the union of the two gamut hulls GH0, GH1 will de facto "annihilate" the common surface. It has to be pointed out that there are usually only non-inverted GCs.

More details will now be given concerning an example of a unified format of a Gamut Boundary Information (GBI) according to the invention using specific normative references and a specific glossary. This unified format is called "Gamut ID metadata"

Normative References:

ITU-R BT.601-5:1995, Studio encoding parameters of digital television for standard 4:3 and wide-screen 16:9 aspect ratios.

ITU-R BT.709-4:2000 Parameter values for the HDTV standards for production and international programme exchange.

IEC 61966-2-4—Ed. 1.0 Multimedia systems and equipment—Color measurement and management—Part 2-4: Color management—Extended-gamut YCC color space for video applications—xvYCC, Jan. 17, 2006.

SMPTE 274M-2005 SMPTE Standard for Television—1920×1080 Image Sample Structure, Digital Representation and Digital Timing Reference Sequences for Multiple Picture Rates.

High-Definition Multimedia Interface, Specification Version 1.3, Nov. 10, 2006.

CIEXYZ (1931)

Glossary:

| | |
|---|---|
| Gamut | A certain complete subset of colors |
| GM | Gamut Mapping |
| GBI | Gamut Boundary Information - is a set of gamut instance(s) (GI). |
| GBD | Gamut Boundary Description |
| GM | Gamut Mapping |
| LSB | Least significant bit |
| MSB | Most significant bit |
| GI | Gamut Instance - is a specific GBD. |
| GH | Gamut Hull - is a set of gamut components. |
| GC | Gamut Component |

Introduction Concerning the Structure of the GBI According to the Invention:

In reference to FIG. 3 which shows the hierarchical structure of the GBI according to the invention in CIEXYZ (1931) color space, the Gamut ID metadata contains five sets of different elements:

Gamut Instances (GI),
Gamut Hulls (GH),
Gamut Components (GC),
faces,
vertices.

The actual color gamut is finally described in the GBI according to the invention by vertices and triangular faces in CIEXYZ color space. As faces are triangles, each face is described by the indices of its three vertices.

The logical structure of the GBI comprises, from bottom to top:

A Gamut Component (GC) is a group of connex triangular faces. A GC describes generally a part of a color gamut boundary (2D boundary of a 3D closed volume) in CIEXYZ color space. A GC is described for instance by the indices of the faces that belong to the group of connex triangular faces defining this GC. Each GC is given a GC index.

A Gamut Hull (GH) is a group of connex Gamut Components (GC) building all together a closed boundary description defining a closed volume in CIEXYZ color space. Each GH is described for instance by the indices of the Gamut Components (GCs) that belongs to the group of connex Gamut Components (GCs) defining this GH. A GH may index a single GC, in this case the GC is a closed boundary description by itself. A GH may index several GCs, in that case all GCs concatenated together, that are indexed by the same GH, build a closed boundary description. Each GH is given a GH index.

A Gamut Instance (GI) is a group of Gamut Hulls (GH) building all together one valid Gamut Boundary Description (GBD) of the actual color gamut. A GI is described for instance by the indices of the Gamut Hulls (GH) that belongs to the group of Gamut Hulls (GH) defining this gamut instance (GI). A GI may index a single GH, in this case one single GH describes by itself the actual color gamut. A GI may index several GHs, in this case the union of the volumes defined by the GHs describe the actual color gamut. Each GH is preferably given an GH index.

The GBI contains one or more different Gamut Instances (GI). Each GI is a complete and valid Gamut Boundary Description (GBD) of the actual color gamut. Preferably, two GIs differ in at least one of the following characteristics:

Level of detail
The higher the level the higher is the number of faces in the GC defining the GI.
Non-convex shape
A GI may allow or not allow the use of non-convex shapes.
Percentage of gamut colors
Different GIs may contain different percentages of the colors of the actual gamut.

Detailed Description of a Unified Format "Gamut ID Metadata" of the GBI:

An example of a binary unified format of a GBI according to the invention is summarized in Table 2 and is further specified with more details as so-called "Gamut ID metadata".

TABLE 2

| Byte # (hex) | Description |
| --- | --- |
| 00 | Basic header |
| 04 + VSIZE | Extended header |
| ID_GI | Gamut Instances (GI) |
| ID_GH | Gamut Hulls (GH) |
| ID_GC | Gamut Components (GC) |
| ID_F | Faces |
| ID_V | Vertices |

Basic Header of the Gamut ID Metadata:

The Gamut ID metadata starts with a basic header that contains a minimal set of gamut information according to Table 3. The basic header is compatible to High Definition Multimedia Interface (HDMI) gamut-related metadata.

The FF and FM bits are the Format_Flag and Face_Mode flags and should be zero for compatibility with HDMI standard. The ID flag is usually set to one indicating the presence of data after the basic header. If the ID flag is set to zero the Gamut ID metadata consists only of the basic header and there is no data after the basic header.

ID_PRECISION indicates how many bits are used per color channel in order to define the coordinates of a vertex in color space. The number of bits shall be one of
N=8 bits,
N=10 bits,
N=12 bits.

ID_SPACE indicates which color space is used in order to define the coordinates of vertices. Each color space has three color channels. ID_SPACE shall be one of
ITU-R BT.709, RGB space, encoding according to SMPTE 274M,
xvYCC-601, YCbCr space, encoding according to IEC 61966-2-4—SD,
xvYCC-709, YCbCr space, encoding according to IEC 61966-2-4—HD.
The following choices:
XYZ encoding,
IEC 61966-2-5
are reserved for future use and shall not be used.

The packed basic primary gamut vertices data define four vertices in color space that shall indicate the black, red, green and blue summits of the actual color gamut. When these basic primary gamut vertices are expressed as basic primary gamut vectors $V_{BLACK}$, $V_{RED}$, $V_{GREEN}$, $V_{BLUE}$ in CIEXYZ color space, four more vectors can be calculated as being basic secondary gamut vectors:

$$V_{MAGENTA} = V_{RED} + V_{BLUE} - V_{BLACK},$$

$$V_{CYAN} = V_{GREEN} + V_{BLUE} - V_{BLACK},$$

$$V_{YELLOW} = V_{RED} + V_{GREEN} - V_{BLACK},$$

$$V_{WHITE} = V_{RED} + V_{GREEN} + V_{BLUE} - 2V_{BLACK},$$

TABLE 3

| Byte # (hex) | Size (bytes) | Symbol | Description 7 6 5 4 3 2 1 0 | Values |
| --- | --- | --- | --- | --- |
| 00 | 1 | N | FF FM ID ID_PRECISION ID_SPACE | FF = 0b0 (1 bit) |
| | | | | FM = 0b0 (1 bit) |
| | | | | ID = 0b1 (1 bit) |
| | | | | ID_PRECISION (2 bits): |
| | | | | 0b00: N = 8 bits |
| | | | | 0b01: N = 10 bits |
| | | | | 0b10: N = 12 bits |
| | | | | ID_SPACE (3 bits): |
| | | | | 0b000 ITU-R BT.709 RGB |
| | | | | 0b001 xvYCC-601 |
| | | | | (IEC 61966-2-4 -SD) YCbCr |
| | | | | 0b010 xvYCC-709 |
| | | | | (IEC 61966-2-4 -HD) YCbCr |
| | | | | 0b011 XYZ encoding |
| | | | | 0b100 IEC 61966-2-5 |
| | | | | 0b101 reserved |
| | | | | 0b110 reserved |
| | | | | 0b111 reserved |
| 01 | 1 | | Number_Vertices_H | 0h00 |
| 02 | 1 | | Number_Vertices_L | 0h03 |
| 03 | VSIZE | | Packed basic vertices data | See below |

From these eight vectors, a distorted cube is obtained in CIEXYZ color space. This cube can be considered as an approximation of the actual color gamut. VSIZE is the size of packed basic vertices data and is defined according to Table 4.

TABLE 4

| N | VSIZE |
|---|---|
| 8 | 12 |
| 10 | 15 |
| 12 | 18 |

Packing of Vertices:

In the basic header and other parts of the GBI according to the invention, vertices are packed as follows. The packed basic vertices data contains encoded color values, in this order, either RGB or YCbCr or XYZ. The vertices are listed in the following order black, red, green, blue. When N=8, the 12 color values are directly coded into 12 bytes. When N=10, the vertices are packed according to Table 5. When N=12, the vertices are packed according to Table 6.

TABLE 5

| Relative byte # (hex) | Size (bytes) | Description 7 6 5 4 3 2 1 0 |
|---|---|---|
| 00 | 1 | A_high |
| 01 | 1 | A_low             B_high |
| 02 | 1 | B_low             C_high |
| 03 | 1 | C_low             D_high |
| 04 | 1 | D_low |

TABLE 6

| Relative byte # (hex) | Size (bytes) | Description 7 6 5 4 3 2 1 0 |
|---|---|---|
| 00 | 1 | A_high |
| 01 | 1 | A_low             B_high |
| 02 | 1 | B_low |
| 03 | 1 | C_high |
| 04 | 1 | C_low             D_high |
| 05 | 1 | D_low |

Extended Header of the Gamut ID Metadata:

The extended header follows the basic header and is defined according to Table 7.

TABLE 7

| Byte # (hex) | Size (bytes) | Symbol | Description | Values (decimal) |
|---|---|---|---|---|
| VISZE + 03 | 2 | ID_GI | Offset to Gamut Instances (GI) | [0; 0hFFFF] |
| VISZE + 05 | 2 | ID_GH | Offset to Gamut Hulls (GH) | [0; 0hFFFF] |
| VISZE + 07 | 2 | ID_GC | Offset to Gamut Components (GC) | [0; 0hFFFF] |
| VISZE + 09 | 2 | ID_F | Offset to faces | [0; 0hFFFF] |
| VISZE + 0B | 2 | ID_V | Offset to vertices | [0; 0hFFFF] |
| VISZE + 0D | 1 | | Reserved | 0 |
| VISZE + 0E | 1 | | Reserved | 0 |
| VISZE + 0F | 1 | K | Number of levels of detail | $1 \leq K \leq 255$ |
| VISZE + 10 | 2 | $F_{MAX}$ | Maximum number of faces in lowest level of detail | $F_{MAX} \leq F$ (F see Table 8) |

TABLE 7-continued

| Byte # (hex) | Size (bytes) | Symbol | Description | Values (decimal) |
|---|---|---|---|---|
| VISZE + 12 | 1 | P | Number of levels of color population | $1 \leq P \leq 128/K$ |
| VISZE + 13 | 1 | $2Q_0$ | Double of percentages of gamut colors | [0; 200] |
| VISZE + 13 + 01 | 1 | $2Q_1$ | Double of percentages of gamut colors | [0; 200] |
| . | | | . | |
| . | | | . | |
| VISZE + 13 + P − 1 | 1 | $2Q_{P-1}$ | Double of percentages of gamut colors | [0; 200] |
| VISZE + 13 + P | 1 | X | Convex or non-convex shape X = 1: all GIs and all GHs shall be convex X = 2: GIs and GHs may be convex or non-convex | $1 \leq X \leq 2$ |

16 bit integer or address values are encoded into 2 bytes with the MSBs in the first byte and the LSBs in the second byte (MSB=Most Significant Bit, and LSB=Lowest Significant Bit).

ID_GI, ID_GH, ID_GC, ID_F and ID_V give the offset in bytes from the beginning of Gamut ID metadata to the beginning of Gamut Instances (GIs), Gamut Hulls (GHs), Gamut Components (GCs), faces and vertices data, respectively.

K indicates the number of levels of details. The GBI contains at least K GIs (in fact, a GBI contains a number of GI, the number being the product of X, P and K). If K=1 there are no different level of details. Each GI is marked individually with a level of detail (0, 1, . . . , K−1), see Table 9.

$F_{MAX}$ is a maximum number of faces to gives an indication of the size of data describing a gamut for a given level of details. When a GI has the lowest level of detail (level 0), it should not reference more than $F_{MAX}$ faces. See Table 9 for definition of level of details. See Table 15 for faces definition.

P indicates the number of alternative GIs populated by different percentages of colors of the actual color gamut. The GBI contains at least P GIs (in fact, a GBI contains a number of GI, the number being the product of X, P and K). Each GI is marked individually with a color population level (0, 1, . . . , P−1), see Table 9.

$2Q_0 \ldots 2Q_{P-1}$ are the doubles of the percentages $Q^0 \ldots Q_{P-1}$ of colors associated to the color population levels (0, 1, . . . , P−1). A percentage shall approximately indicate how many percent of colors (0 . . . 100) of the actual color gamut are contained in the volume described by a GI of the corresponding color population level. Percentages can be defined in steps of 0.5 points.

X indicates whether the GBI uses only convex shapes (X=1) or may use convex and non-convex shapes (X=2). When X=1, each GI shall correspond to a convex shape and each GH shall correspond to a convex shape. When X=2, GIs are organized into pairs. Each pair contains a first GI (marked as "convex", see Table 9) that corresponds to a convex shape and which references only GHs that correspond to a convex shape. The second GI of the pair (marked as "non convex", see Table 9) may correspond to a non-convex shape and may reference GHs that correspond to non-convex shapes. The GBI contains at least X GIs (in fact, a GBI contains a number of GI, the number being the product of X, P and K).

Formatting the Gamut Instances (GI) in the Gamut ID Metadata:

As already mentioned, the GBI according to the invention contains one or more GIs, i.e. one or more descriptions of the actual color gamut. One single description is called a Gamut Instance (GI). A GBI user may use any one or any number of GIs of the GBI. The definition of GIs starts at byte number ID_GI according to Table 8. The order in the list is arbitrary but fixed.

TABLE 8

| Byte # (hex) | Size (bytes) | Symbol | Description | Values |
|---|---|---|---|---|
| ID_GI | 1 | I | Total number of Gamut Instances (GI) | I = X P K |
| ID_GI + 01 | 6 + $H_0$ | | Definition of GI no. 0, | See Table 9 |
| ID_GI + 01 + 6 + $H_0$ | 6 + $H_1$ | | Definition of GI no. 1 | See Table 9 |
| ⋮ | | | | |
| ID_GI + 01 + $\sum_{i=0}^{I-2} (6 + H_I)$ | 6 + $H_{I-1}$ | | Definition of GI no. I-1 | See Table 9 |

In table 8, the symbol I is the number of GIs and shall be equal to the product of X, P and K. Each GI is then defined according to Table 9.

TABLE 9

| Relative byte # (hex) | Size (bytes) | Symbol | Description | Values |
|---|---|---|---|---|
| 00 | 1 | $K_i$ | Level of detail of this GI | $0 \leq K_i \leq K - 1$ |
| 01 | 2 | $F_i^{GI}$ | Number of faces used by this GI | $F_i^{GI} \leq 2^i F_{MAX}$ ($F_{MAX}$ see Table 7) |
| 03 | 1 | $X_i^{GI}$ | This GI defines a convex shape ($X_i^{GI} = 1$) or may define a non-convex shape ($X_i^{GI} = 2$) | $1 \leq X_i^{GI} \leq X$ (X see Table 7) |
| 04 | 1 | $P_i$ | Level of color population of this GI | $0 \leq P_i \leq P - 1$ (P see Table 7) |
| 05 | 1 | $H_i$ | Number of Gamut Hulls (GH) referenced by this GI | $1 \leq H_i \leq H$ (H see Table 10) |
| 06 | $H_i$ | | Indices of referenced GHs | [0; H − 1] valid indices of GH |

$K_i$ is the level of detail of the i-th GI. The GI is of lowest level of detail if $K_i=0$. If $K_i$ is larger than the level of detail $K_j$ of a j-th GI of same type ($P_i=P_j$, $X_i=X_j$) then the i-th GI has a higher level of detail, i.e. a more precise geometric description, than the j-th GI.

$F_i^{GI}$ is the number of faces used by the i-th GI. This number should correspond to the number of faces referenced by those Gamut Components (GC, see Table 12) that are referenced by those Gamut Hulls (GH, see Table 10) that are referenced by the i-th GI.

The number $F_i^{GI}$ of faces should be equal or smaller than $2^{K_i} F_{MAX}$ ($F_{MAX}$ see Table 8).

$X_i^{GI}$ is an indicator on convex or non-convex shape. If $X_i^{GI}=1$, the i-th GI defines a convex shape and each GH referenced by the i-th GI defines a convex shape by itself. If $X_i^{GI}=2$, the i-th GI may define a convex or a non-convex shape and each of the GHs referenced by the i-th GI may define a convex or a non-convex shape by itself.

$P_i$ is the color population level of the i-th GI. The i-th GI shall contain approximately $Q_{P_i}$ percent of colors of the actual color gamut. Different GIs with same color population level shall contain approximately the same percentage of colors of the actual color gamut. A GI with color population level $P_i$ shall contain at least all colors of another GI with color population level $P_j$ if $P_j > P_i$, $K_j = K_i$ and $X_j = X_i$.

$H_i$ is the number of Gamut Hulls (GH) that are referenced by the i-th GI. If an i-th GI references one Gamut Hull, then $H_i=1$ and the Gamut Hull describes the actual gamut. If an i-th GI references more than one Gamut Hulls, then $H_i>1$ and the union of the volumes of all referenced Gamut Hulls describes the actual gamut. The $H_i$ indices of GHs have each one byte.

Formatting the Gamut Hulls (GH) in the Gamut ID Metadata:

The GBI contains one or more Gamut Hulls (GH). Each GH is a closed surface and defines a closed volume in the color space. A GH may be referenced by one or more GIs of the GBI. A GI may reference one or more GHs. A GH may describe by itself the actual color gamut or just a part of it. The definition of the GHs starts at byte number ID_GH according to Table 10. The order in the list is arbitrary but fixed.

TABLE 10

| Byte # (hex) | Size (bytes) | Symbol | Description | Values |
|---|---|---|---|---|
| ID_GH | 1 | H | Total number of Gamut Hulls (GH) | $0 < H \leq 255$ |
| ID_GH + 01 | 3 + $C_0 + \overline{C_0}$ | | Definition of GH no. 0 | See Table 11 |

TABLE 10-continued

| Byte # (hex) | Size (bytes) | Symbol | Description | Values |
|---|---|---|---|---|
| $\text{ID\_GH} + 01 + 2 + C_0 + \overline{C_0}$ | $3 + C_1 + \overline{C_1}$ | | Definition of GH no. 1 | see Table 11 |
| ⋮ | | | | |
| $\text{ID\_GH} + 01 + \sum_{h=0}^{H-2}(3 + C_h + \overline{C_{H-1}})$ | $3 + C_{H-1} + \overline{C}_{H-1}$ | | Definition of GH no. H-1 | See Table 11 |

H is the total number of GHs contained in the GBI. Each GH is defined according to Table 11.

TABLE 11

| Relative byte # (hex) | Size (bytes) | Symbol | Description | Values |
|---|---|---|---|---|
| 00 | 1 | $X_h^{GH}$ | This GH defines a convex shape ($X_h^{GH} = 1$) or may define a non-convex shape ($X_h^{GH} = 2$) | $1 \leq X_h^{GH} \leq X$ (X see Table 7) |
| 01 | 1 | $C_h$ | Number referenced Gamut Components (GC) that are used non-inverted by this GH | $1 \leq C_k + \overline{C}_k \leq C$ (C see Table 12) |

TABLE 11-continued

| Relative byte # (hex) | Size (bytes) | Symbol | Description | Values |
|---|---|---|---|---|
| 02 | 1 | $\overline{C}_h$ | Number of referenced Gamut Components (GC) that are used inverted by this GH | |
| 03 | $C_h$ | | Indices of referenced Gamut Components (GC) | [0; C − 1] valid indices of GCs |
| $03 + C_h$ | $\overline{C}_h$ | | Indices of referenced Gamut Components (GC) used in an inverted manner | |

$C_h + \overline{C}_h$ is the number of Gamut Components (GC) that are referenced by the h-th GH. If a h-th GH references one GC, then $C_h + \overline{C}_h = 1$ and the GC defines by itself the closed surface of the GH. If a h-th GH references more than one GC, then $C_h + \overline{C}_h > 1$ and all referenced GCs build together the closed surface of the GH. When a GC is used in an inverted manner, the surface normals of the faces referenced by this GC are used in the inverse sense. For referenced faces, see Table 12. For surface normals, see above.

Formatting the Gamut Components (GC) in the Gamut ID Metadata:

The GBI contains one or more Gamut Components (GC); each gamut component (GC) is a 2D boundary description of a 3D closed volume in the color space. A GC may be referenced by one or more GHs. A GH may reference one or more GCs. A GC may describe a closed surface in 3D color space or a piece of it. The definition of the GCs starts at byte number ID_GC according to Table 12. The order in the list is arbitrary but fixed.

TABLE 12

| Byte # (hex) | Size (bytes) | Symbol | Description | Values |
|---|---|---|---|---|
| ID_GC | 1 | C | Total number of Gamut Components (GC) | $0 < C \leq 255$ |
| ID_GC + 01 | $2 + \lceil F_0 \lceil \text{ld}(F) \rceil / 8 \rceil$ | | Definition of GC no. 0 | See Table 13 |
| $\text{ID\_GC} + 01 + 02 + \lceil F_0 \lceil \text{ld}(F) \rceil / 8 \rceil$ | $2 + \lceil F_0 \lceil \text{ld}(F) \rceil / 8 \rceil$ | | Definition of GC no. 1 | See Table 13 |
| ⋮ | | | | |
| $\text{ID\_GC} + 01 + \sum_{c=0}^{C-2}(02 + \lceil F_c \lceil \text{ld}(F) \rceil / 8 \rceil)$ | $2 + \lceil F_0 \lceil \text{ld}(F) \rceil / 8 \rceil$ | | Definition of GC no. C-1 | See Table 13 |

C is the total number of GCs contained in the GBI. Each GC is defined according to Table 13.

TABLE 13

| Relative byte # (hex) | Size (bytes) | Symbol | Description | Values |
|---|---|---|---|---|
| 00 | 2 | $F_c$ | Number faces referenced by this GC | $1 \leq F_c \leq F$ (F see Table 15) |
| 02 | $\lceil F_c \lceil \text{ld}(F) \rceil / 8 \rceil$ | | Indices of referenced faces | [0; F − 1] valid indices of faces, F see Table 15 |

Hereby is $\lceil\bullet\rceil$ the operation that rounds to the next upper integer and ld($\bullet$) the logarithm to the base of 2.

Packing of Face Indices of the GBI According to the Invention:

The indices of the faces are packed into bytes. Each index of a face takes ld(F) bits. Packing is organized "GC wise", i.e. the first face index of a GC always starts at the beginning of a byte.

In table 14, an example of packing is given when C=2 Gamut Components (GC), each using $F_0=F_1=4$ faces from a total of F=6 faces. Each GC takes $\lceil(\lceil ld(F)\rceil F_c)/8\rceil=\lceil(\lceil ld(6)\rceil 4)/8\rceil=2$ bytes for the indices of the faces. The definition of the GCs requires in total $$1 + 2C + \sum_{c=0}^{C-1} \lceil(\lceil ld(F)\rceil F_c)/8\rceil = 5 + \sum_{c=0}^{1} \lceil(\lceil ld(6)\rceil 4)/8\rceil$$

$$= 5 + 2\lceil 12/8 \rceil$$

$$= 9 \text{ bytes.}$$

TABLE 14

| Byte # (hex) | Size | Value (binary) |||||||| 
|---|---|---|---|---|---|---|---|---|---|
| | | 7 | 6 | 5 | 4 | 3 | 2 | 1 | 0 |
| ID_GC | 1 | 0b00000010 |||||||| 
| ID_GC + 01 | 1 | 0 (MSB) |||||||| 
| ID_GC + 02 | 1 | 0b100 (LSB) |||||||| 
| ID_GC + 03 | 1 | 1. index ||| 2. index ||| 3. index MSBs || 
| ID_GC + 04 | 1 | 3. i. LSB ||| 4. index ||| Unused || 
| ID_GC + 05 | 1 | 0 (MSB) |||||||| 
| ID_GC + 06 | 1 | 0b100 (LSB) |||||||| 
| ID_GC + 07 | 1 | 1. index ||| 2. index ||| 3. index MSBs || 
| ID_GC + 08 | 1 | 3. i. LSB ||| 4. index ||| Unused ||

LSB is least significant bit and MSBs is most significant bits.

Faces of the GBI According to the Invention:

The definition of the faces starts at byte number ID_F according to Table 15. The order in the list is arbitrary but fixed. ID_F is defined in Table 7.

TABLE 15

| Byte # (hex) | Size | Symbol | Description | Values |
|---|---|---|---|---|
| ID_F | 2 | F | Total number of Faces | 1 < F < 65535 |
| ID_F + 02 | $\lceil 3F\lceil ld(V)\rceil/8\rceil$ | | 3F indices of Vertices | [0; V − 1] valid indices of Vertices |

The symbol F is the total number of faces of the GBI. For each face, three indices of vertexes are indicated, in total 3F indices.

If a sample face is defined by three indices index of three vertices V0, V1, V2, respectively, in CIEXYZ space, the surface normal of the face is defined as follows:

$$v = \frac{(V2 - V0) \times (V1 - V0)}{|V2 - V0| \cdot |V1 - V0|}$$

with x being the vector cross product and $|\bullet|$ being the vector length operator.

Packing of Vertex Indices of the GBI According to the Invention:

The indices of the vertices of all faces are packed into bytes. Each index of a face takes ld(V) bits, for V see Table 17. An example of packing is given for the case of F=4 faces and V=4 vertices. Each index of a face takes ld(V)=2 bits. All indices take $\lceil 3F\lceil ld(V)\rceil/8\rceil=3$ bytes. Packing is according to table 16.

TABLE 16

| Byte # (hex) | Size | Value Bits ||||||||
|---|---|---|---|---|---|---|---|---|---|
| | | 7 | 6 | 5 | 4 | 3 | 2 | 1 | 0 |
| ID_F | 2 | 0h0004 |||||||| 
| ID_F + 02 | 1 | F0 index0 || F0 index1 || F0 index2 || F1 index0 || 
| ID_F + 03 | 1 | F1 index1 || F1 index2 || F2 index0 || F2 index1 || 
| ID_F + 04 | 1 | F2 index2 || F3 index0 || F3 index1 || F3 index2 ||

Vertices of the GBI According to the Invention:

The definition of the vertices starts at byte number ID_V, see Table 17. The order in the list is arbitrary but fixed.

TABLE 17

| Byte # (hex) | Size | Symbol | Description | Values |
|---|---|---|---|---|
| ID_V | 2 | V | Total number of vertices | 1 < V < 65535 |
| ID_V + 02 | 2 | R | Number of vertices belonging to gamut ridges | 0 ≤ R ≤ V |
| ID_V + 04 | $\lceil 3VN/8 \rceil$ | | 3V encoded color values defining V vertices | According to color encoding |
| ID_V + 04 + $\lceil 3VN/8 \rceil$ | $\lceil R\lceil ld(V)\rceil/8\rceil$ | | R indices of vertices belonging to gamut ridges | [0; V − 1] valid indices of vertices |

Hereby is $\lceil\bullet\rceil$ the operation that rounds to the next upper integer.

V is the total number of vertices of the GBI (not counting the four basic vertices of the basic header).

The vertices belonging to gamut ridges are a subset of all vertices. Gamut ridges are positions on the gamut surface having non continuous surface curvature such as ridges or summits. At those vertices, the gamut shape shall not be smoothed by a user of the GBI.

Packing of vertices is explained above.

From the above description, we can infer that the bytes length L of the GBI according to the invention is:

$$L = 29 + VSIZE + P + 6I + 3H + 2C + \sum_I H_i + \sum_H (C_h + \overline{C}_h) +$$

$$\sum_C (\lceil(\lceil ld(F)\rceil F_c)/8\rceil) + \lceil 3F\lceil ld(V)\rceil/8\rceil + \lceil 3VN/8\rceil + \lceil R\lceil ld(V)\rceil/8\rceil$$

With

VSISZE: Size of packed basic vertices (basic header)
I: Number of Gamut Instances (GI);
H: Number of Gamut Hulls (GH);
C: Number of Gamut Components (GC);
F: Number of Faces;
V: Number of Vertices
$H_i$: Number of GH used by the i-th GI;
$C_h$: Number of GC used by the h-th GH;
$\overline{C_h}$: Number of inverted GC used by the h-th GH;
$F_c$: Number of Faces used by the c-th GC
N: Number of bits/color channel.
R: Number of vertices belonging to gamut ridges.

Example for HDMI Compatible Gamut ID Metadata

All details have now been given concerning an example of formatting of a Gamut Boundary Information (GBI) according to the invention.

We will now show how the above formatting of a GBI according to the invention may be compliant with HDMI standard version 1.3.

The High Definition Multimedia Interface (HDMI) allows in the transmission profile P0 (28 bytes) a gamut metadata packet defined in the following table 18, corresponding to the Table E-1 of HDMI standard:

TABLE 18

| Byte | 7 | 6 | 5 | 4 | 3 | 2 | 1 | 0 |
|---|---|---|---|---|---|---|---|---|
| 0 | Format_Flag = 0 | Face_Mode | Rsvd(0) | GSD_Color_Precision | | GBD_Color_Space | | |
| 1 | | | | Number_Vertices_H | | | | |
| 2 | | | | Number_Vertices_L | | | | |
| 3 ... VSIZE + 2 | | | | Packed_GBD_Vertices_Data[0 ... VSIZE − 1] | | | | |
| VSIZE + 3 | | | | Number_Faces_H | | | | |
| VSIZE + 4 | | | | Number_Faces_L | | | | |
| VSIZE + 5 ... | | | | Packed_GBD_Faces_Data[0 ... FSIZE − 2] | | | | |
| VSIZE + FSIZE + 4 | | | | Packed_GBD_Faces_Data[FSIZE − 1] | | | | |

According to HDMI standard, this gamut metadata packet is mandatory as soon as the video content is represented in IEC 61966-2-4 YCbCr coordinates. The HDMI standard allows for the transmission profile P0 four basic primary colors black, red, green and blue.

The formatting described above of the GMI according to the invention is compatible with the HDMI gamut metadata packet. As an example, it is shown in the following how to encode the sample gamut shown in FIG. 6.

Using the same formatting as described above, the Gamut ID metadata basic header which is the HDMI compatible part of the GBI, is then shown in Table 19. Format_Flag (FF) is always 0, indicating vertex mode. Face_Mode (FM) is always 0 according to HDMI specification version 1.3. The bit no. 5 is reserved (0) in HDMI specification. This bit is used for an ID flag. Set to 1, it indicates the presence of the other parts of the Gamut ID metadata.

TABLE 19

| Byte # (hex) | Size (bytes) | Symbol | 7 | 6 | 5 | 4 | 3 | 2 | 1 | 0 | Values |
|---|---|---|---|---|---|---|---|---|---|---|---|
| 00 | 1 | N | FF | FM | ID | ID_PRECISION | | ID_SPACE | | | 0 0 1 0 0 0 0 0 |
| 01 | 1 | | | | | Number_Vertices_H | | | | | 0h00 |
| 02 | 1 | | | | | Number_Vertices_L | | | | | 0h03 |
| 03 | 12 | | | | | Packed basic vertices data | | | | | See below |

In this example, RGB is encoded according to ITU-R BT.709 with N=8 bit/color channel.

Figure 6:
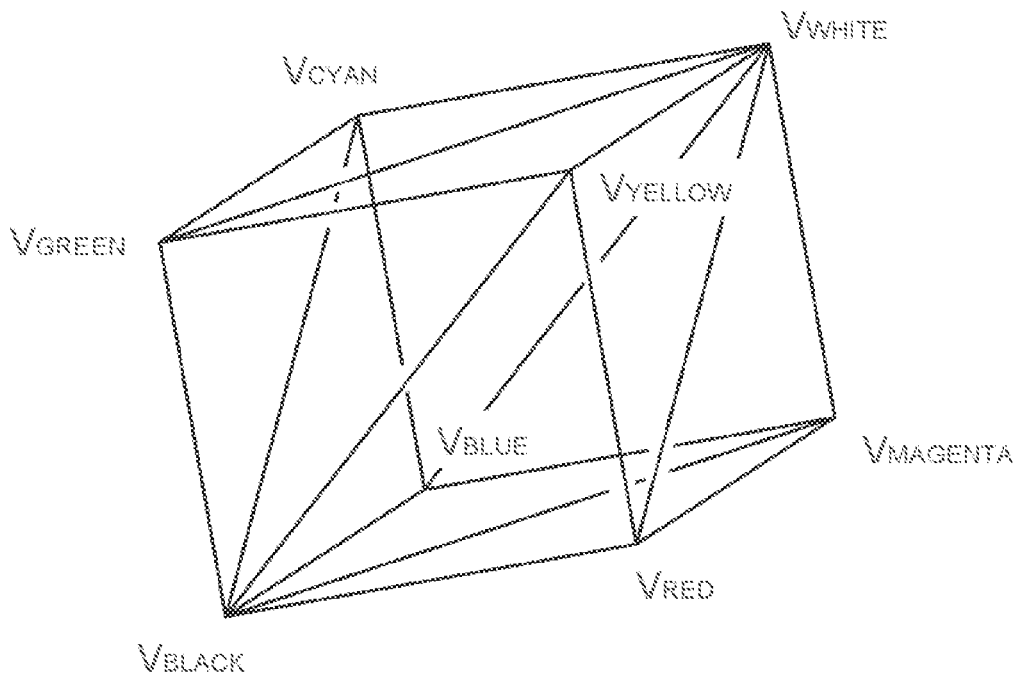
FIG. 6 illustrates a sample color gamut to encode according to an example of formatting the Gamut Boundary Information (GBI) according to the invention into "Gamut ID metadata".

From the eight vertices corresponding to the basic primary and secondary colors in FIG. 6, only black, red, green and blue are encoded in the basic header, according to HDMI specification: index 0: $V_{BLACK}$, index 1: $V_{RED}$, index 2: $V_{GREEN}$ and index 3: $V_{BLUE}$.

The CIEXYZ vectors $V_{BLACK}$, $V_{RED}$, $V_{GREEN}$, $V_{BLUE}$ are encoded according to according the ID_PRECISION and ID_SPACE fields into 12 bytes.

The extended header is set as shown in Table 20. In this example, the following Gamut ID metadata characteristics are chosen:
K=1: level of detail having not more than $F_{MAX}$=12 faces;
P=1: color population level, with $2Q_0$=100% of colors;
X=1: no use of non-convex shapes.

TABLE 20

| Byte # (hex) | Size (bytes) | Symbol | Description | Values (hex) |
|---|---|---|---|---|
| 0F | 1 | ID_GI | Offset to Gamut Instances (GI) - MSB | 00 |
| 10 | 1 | | Offset to Gamut Instances (GI) - LSB | 22 |

TABLE 20-continued

| Byte # (hex) | Size (bytes) | Symbol | Description | Values (hex) |
|---|---|---|---|---|
| 11 | 2 | ID_GH | Offset to Gamut Hulls (GH) | 002A |
| 13 | 2 | ID_GC | Offset to Gamut Components (GC) | 002F |
| 15 | 2 | ID_F | Offset to faces | 0038 |
| 17 | 2 | ID_V | Offset to vertices | 0h0048 |
| 19 | 1 | | Reserved | 00 |
| 1A | 1 | | Reserved | 00 |
| 1B | 1 | K | Number of levels of detail | 01 |
| 1C | 2 | $F_{MAX}$ | Maximum number of faces in lowest level of detail | 0C |
| 1E | 1 | P | Number of levels of color population | 01 |
| 1F | 1 | $2Q_0$ | Double of percentages of gamut colors | C8 |
| 20 | 1 | X | Convex or non-convex shape | 01 |

One Gamut Instance (GI) is defined according to Table 21.

TABLE 21

| Byte # (hex) | Size (bytes) | Symbol | Description | Values (hex) |
|---|---|---|---|---|
| ID_GI = 21 | 1 | I | Total number of Gamut Instances (GI) | 01 |
| 22 | 1 | $K_i$ | Level of detail of this GI | 00 |
| 23 | 1 | $F_0^{GI}$ | Number of faces used by this GI - MSB | 00 |
| 24 | 1 | | Number of faces used by this GI - LSB | 0C |
| 25 | 1 | $X_i^{GI}$ | This GI defines a convex shape ($X_i^{GI}$ = 1) or may define a non-convex shape ($X_i^{GI}$ = 2) | 01 |
| 26 | 1 | $P_i$ | Level of color population of this GI | 00 |
| 27 | 1 | $H_i$ | Number of Gamut Hulls (GH) referenced by this GI | 01 |
| 28 | 1 | | Indices of referenced GHs | 00 |

One Gamut Hull (GH) is defined according to Table 22.

TABLE 22

| Byte # (hex) | Size (bytes) | Symbol | Description | Values (hex) |
|---|---|---|---|---|
| ID_GH = 29 | 1 | H | Total number of Gamut Hulls (GH) | 01 |
| 2A | 1 | $X_i^{GH}$ | This GH defines a convex shape ($X_i^{GH}$ = 1) or may define a non-convex shape ($X_i^{GH}$ = 2) | 01 |
| 2B | 1 | $C_h$ | Number referenced Gamut Components (GC) that are used by this GH in a non-inverted manner | 01 |
| 2C | 1 | $\overline{C}_h$ | Number referenced Gamut Components (GC) that are used by this GH in an inverted manner | 00 |
| 2D | 1 | | Indices of referenced Gamut Components (GC) | 00 |

One Gamut Components (GC) is defined according to Table 23.

TABLE 23

| Byte # (hex) | Size (bytes) | Symbol | Description | Values 7 6 5 4 3 2 1 0 |
|---|---|---|---|---|
| ID_GC = 2E | 1 | C | Total number of Gamut Components (GC) | 0h01 |
| 2F | 1 | $F_c$ | Number faces referenced by this GC - MSB | 0h00 |
| 30 | 1 | | Number faces referenced by this GC - LSB | 0h0C |
| 31 | 1 | | Indices of referenced faces | 0b0000　　0b0001 |
| 32 | 1 | | | 0b0010　　0b0011 |
| 33 | 1 | | | 0b0100　　0b0101 |
| 34 | 1 | | | 0b0110　　0b0111 |
| 35 | 1 | | | 0b1000　　0b1001 |
| 36 | 1 | | | 0b1010　　0b1011 |

12 Faces are defined, each Face is defined by three Vertex indices, each index taking $\lceil id(V) \rceil = 3$ bits, see FIG. 6: index 0: 0, 6, 2, index 1: 0, 1, 6, index 2: 0, 2, 5, index 3: 0, 5, 3, index 4: 0, 3, 4, index 5: 0, 4, 1, index 6: 7, 2, 5, index 7: 7, 6, 2, index 8: 7, 6, 1, index 9: 7, 1, 4, index 10: 7, 3, 5, index 11: 7, 4, 3.

The Faces are defined as follows according to Table 24.

TABLE 24

| Byte # (hex) | Size | Symbol | Value Bits 7 6 5 4 3 2 1 0 |
|---|---|---|---|
| ID_F = 37 | 1 | F | 0h00 |
| 38 | 1 | | 0h0C |
| 39 | 1 | | 0　　　　6　　　2 * |
| 3A | 1 | | 2 **　　0　　　　1　　6 * |
| 3B | 1 | | 6 **　　　0　　　　2 |
| 3C | 1 | | 5　　　　0　　　5 * |
| 3D | 1 | | 5 **　　3　　　　0　　3 * |
| 3E | 1 | | 3 **　　　4　　　　0 |
| 3F | 1 | | 4　　　　1　　　7 * |
| 40 | 1 | | 7 **　　2　　　　5　　7 * |
| 41 | 1 | | 7 **　　　6　　　　2 |
| 42 | 1 | | 7　　　　6　　　1 * |
| 43 | 1 | | 1 **　　7　　　　1　　4 * |
| 44 | 1 | | 4 **　　　7　　　　3 |
| 45 | 1 | | 5　　　　7　　　4 * |
| 46 | 1 | | 4 **　　3　　　Not used |

\* MSB -
\*\* LSB

The eight vertices corresponding to the basic primary and secondary colors taken as summits of the color gamut boundary take each 3N bits: index 0: $V_{BLACK}$, index 1: $V_{RED}$, index 2: $V_{GREEN}$, index 3: $V_{BLUE}$, index 4: $V_{MAGENTA} = V_{RED} + V_{BLUE} - V_{BLACK}$, index 5: $V_{CYAN} = V_{GREEN} + V_{BLUE} - V_{BLACK}$, index 6: $V_{YELLOW} = V_{RED} + V_{GREEN} - V_{BLACK}$, index 7: $V_{WHITE} = V_{RED} + V_{GREEN} + V_{BLUE} - 2V_{BLACK}$. The vertices are defined according to Table 25.

TABLE 25

| Byte # (hex) | Size | Symbol | Description | Values (hex) |
|---|---|---|---|---|
| ID_V = 47 | 2 | V | Total number of vertices | 0h0008 |
| 49 | 2 | R | Number of vertices belonging to gamut ridges | 0h0000 |
| 4B | 24 | | 3V = 24 encoded color values defining V vertices | According to color encoding |

These 8 vertices are encoded according to the defined color encoding depending in ID_SPACE and ID_PRECISION fields of the basic header.

If color precision is N=8 then the size of HDMI and of the Gamut ID metadata is illustrated in table 26.

TABLE 26

| HDMI 1.3 gamut-related metadata | Gamut ID metadata |
|---|---|
| 17 bytes | 100 bytes |

The size of the Gamut ID metadata of the GMI according to the invention is then larger that the size of the gamut metadata packet of the HDMI version 1.3 due to three reasons:
Including 8, not 4 vertices
Including indexed faces list
Some header overhead While the present invention is described with respect to particular examples and preferred embodiments, it is understood that the present invention is not limited to these examples and embodiments. The present invention as claimed therefore includes variations from the particular examples and preferred embodiments described herein, as will be apparent to one of skill in the art. While some of the specific embodiments may be described and claimed separately, it is understood that the various features of embodiments described and claimed herein may be used in combination.

The invention claimed is:

1. A video sink configured to implement a method for describing, in a color space, an actual color gamut by at least one gamut boundary description, called gamut instance wherein said method comprises:
    defining of at least one gamut hull as a closed surface bordering a volume, such that each gamut instance is formed by the union of the volume(s) bordered by at least one gamut hull;
    defining a plurality of gamut components such that each gamut hull is formed by the concatenation of several connex gamut components, wherein each gamut component represents a surface that is meshed into a plurality of connex faces, wherein at least one gamut component of said plurality of gamut components is used for the definition of at least two different gamut hulls.

2. The video sink according to claim 1, wherein the method further comprises defining a plurality of gamut hulls, wherein the volumes of at least two of said gamut hulls of said plurality that are used to define a same gamut instance have a non-empty intersection.

3. The video sink according to claim 2, wherein, in said method, at least one gamut instance is non-convex, and any gamut hull that is used to define a gamut instance, even the non-convex gamut instance, is convex.

4. The video sink according to claim 1, wherein said method further comprises defining of a plurality of gamut hulls, wherein at least one gamut hull of said plurality of gamut hulls is used for the definition of at least two different gamut instances.

5. The video sink according to claim 1, wherein said method further comprises defining of a plurality of gamut instances, wherein each of them describes differently the same color gamut of the color device in the same color space.

6. The video sink according to claim 5 wherein, in said method, at least one gamut instance is convex and at least one other gamut instance is non-convex.

7. The video sink according to claim 5 wherein, in said method, among said plurality of gamut instances, some of them contains different percentages of colors of the actual color gamut.

8. The video sink according to claim 5, wherein, in said method, among said plurality of gamut instances, some of them describe the same shape with different level of details.

9. The video sink according to claim 1, wherein said method further comprises defining of elementary polygons, notably triangles, such that each Gamut Component is formed by the concatenation of several connex elementary polygons.

10. A video sink for color gamut mapping of colors, in a given color space, from an actual source color gamut to an actual target color gamut, the video configured to implement a method for describing either source or target, or both, actual color gamut by at least one gamut boundary description, called a gamut instance, wherein said description method comprises the steps of:
    defining of at least one gamut hull as a closed surface bordering a volume, such that each gamut instance is formed by the union of the volume(s) bordered by at least one gamut hull;
    defining a plurality of gamut components such that each gamut hull is formed by the concatenation of several connex gamut components, wherein each gamut component represents a surface that is meshed into a plurality of connex faces, wherein at least one gamut component of said plurality of gamut components is used for the definition of at least two different gamut hulls.

11. The video sink for color gamut mapping of colors according to claim 10, wherein said description method comprises defining of a plurality of gamut hulls, wherein volumes of at least two of said gamut hulls of said plurality that are used to define a same gamut instance having a non-empty intersection.

12. The video sink for color gamut mapping of colors according to claim 10, wherein, in said method, at least one gamut hull is non-convex, and any gamut hull that is used to define a gamut instance, even the non-convex gamut instance, is convex.

13. The video sink for color gamut mapping of colors according to claim 10, wherein said description method further comprises defining of a plurality of gamut hulls, wherein at least one gamut hull of said plurality of gamut hulls is used for the definition of at least two different gamut instances.

14. The video sink for color gamut mapping of colors according to claim 10, wherein said description method further comprises defining of a plurality of gamut instances, wherein each of definition described differently the same color gamut of the color device in the same color space and wherein at least one gamut instance is convex and at least one other gamut instance is non-convex.

* * * * *